April 28, 1964 E. G. PERRY, JR., ET AL 3,130,903

PUNCHING CONVERTER

Original Filed Sept. 8, 1959 3 Sheets-Sheet 1

INVENTORS
Edward Gordon Perry, Jr.
& Herman L. Philipson, Jr.
BY
Stevens, Davis, Miller & Mosher
ATTORNEYS April 28, 1964 E. G. PERRY, JR., ETAL 3,130,903

PUNCHING CONVERTER

Original Filed Sept. 8, 1959 3 Sheets-Sheet 2

INVENTORS
Edward Gordon Perry, Jr.
& Herman L. Philipson, Jr.
BY
Stevens, Davis, Miller & Mosher
ATTORNEYS April 28, 1964 E. G. PERRY, JR., ETAL 3,130,903
PUNCHING CONVERTER
Original Filed Sept. 8, 1959 3 Sheets-Sheet 3

INVENTORS
Edward Gordon Perry, Jr.
& Herman L. Philipson, Jr.
BY
Stevens, Davis, Miller & Mosher
ATTORNEYS United States Patent Office 3,130,903

Patented Apr. 28, 1964

3,130,903

PUNCHING CONVERTER

Edward Gordon Perry, Jr., and Herman L. Philipson, Jr., Dallas, Tex., assignors, by mesne assignments, to Sperry Rand Corporation, New York, N.Y., a corporation of Delaware Original application Sept. 8, 1959, Ser. No. 838,470, now Patent No. 3,064,560, dated Nov. 20, 1962. Divided and this application Jan. 2, 1962, Ser. No. 168,866
7 Claims. (Cl. 234—63)

This application is a division of application Serial No. 838,470 of Edward Gordon Perry, Jr. and Herman L. Philipson, Jr., filed September 8, 1959, for Printing Recorder and Punching Converter.

This invention relates to a punching converter for the purpose of punching the same information, in the form of perforations on the same or auxiliary card or invoice in accordance with the printed information provided by the printing recorder.

The punching converter, which, as indicated hereinafter, may be of several different constructions, is adapted to sense, by photo electric means, the information which is recorded on the invoice in the form of the printed code and to actuate a standard card punching apparatus to record the same information on the invoice, or copy thereof, in the form of perforations. Thus, the punched invoice (or card) may be used later in automatic accounting operations.

Briefly and simply stated, the punching converter of the present invention includes a means for illuminating the portion of the invoice where the printed code is located. An optical system, including a lens and a series of mirrors will focus the image of the printed code on a photo cell matrix. A suitable decoding unit, operating in response to the actuation of the photo cell matrix, will actuate a punch so as to perforate the card or invoice and thereby provide, in the form of a punched code, the same information which was recorded on the invoice in the form of the printed code. The punching converter will also include various means for adjusting the positions of the mirrors for the purpose of properly aligning the image of the printed code with respect to the photo cell matrix.

It is an object of the present invention to provide a punching converter for the purpose of translating information in form of a printed code into a punched code.

Other and further objects and advantageous features of the present invention will hereinafter more fully appear when considered in connection with a detailed description of the drawings wherein:

FIGURE 1 shows an invoice card which may be used in conjunction with the present invention. The blocks in the upper right-hand corner of the invoice 145 are coded representations of the same numerical value appearing below in the lower right-hand corner of the same invoice.

Figure 1:
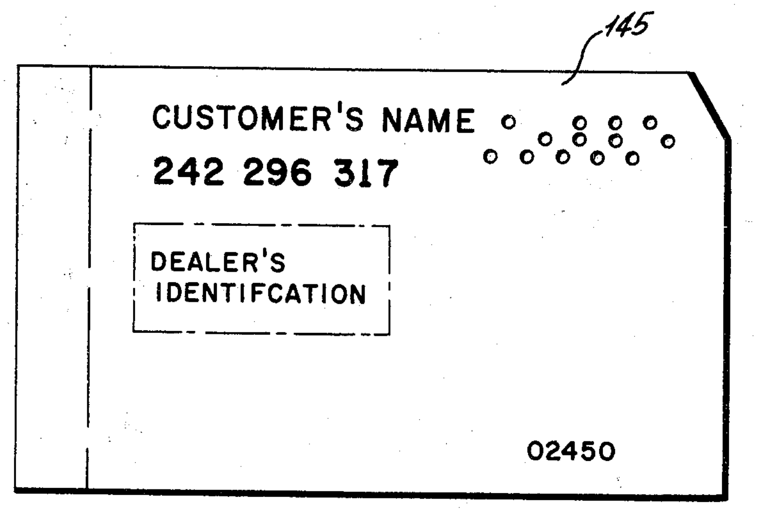
FIGURE 1 is a plan view, with certain parts broken away, of a typical invoice adapted for use in the punching converter of FIGURE 2 and showing the same with information printed thereon.
Figure 2:
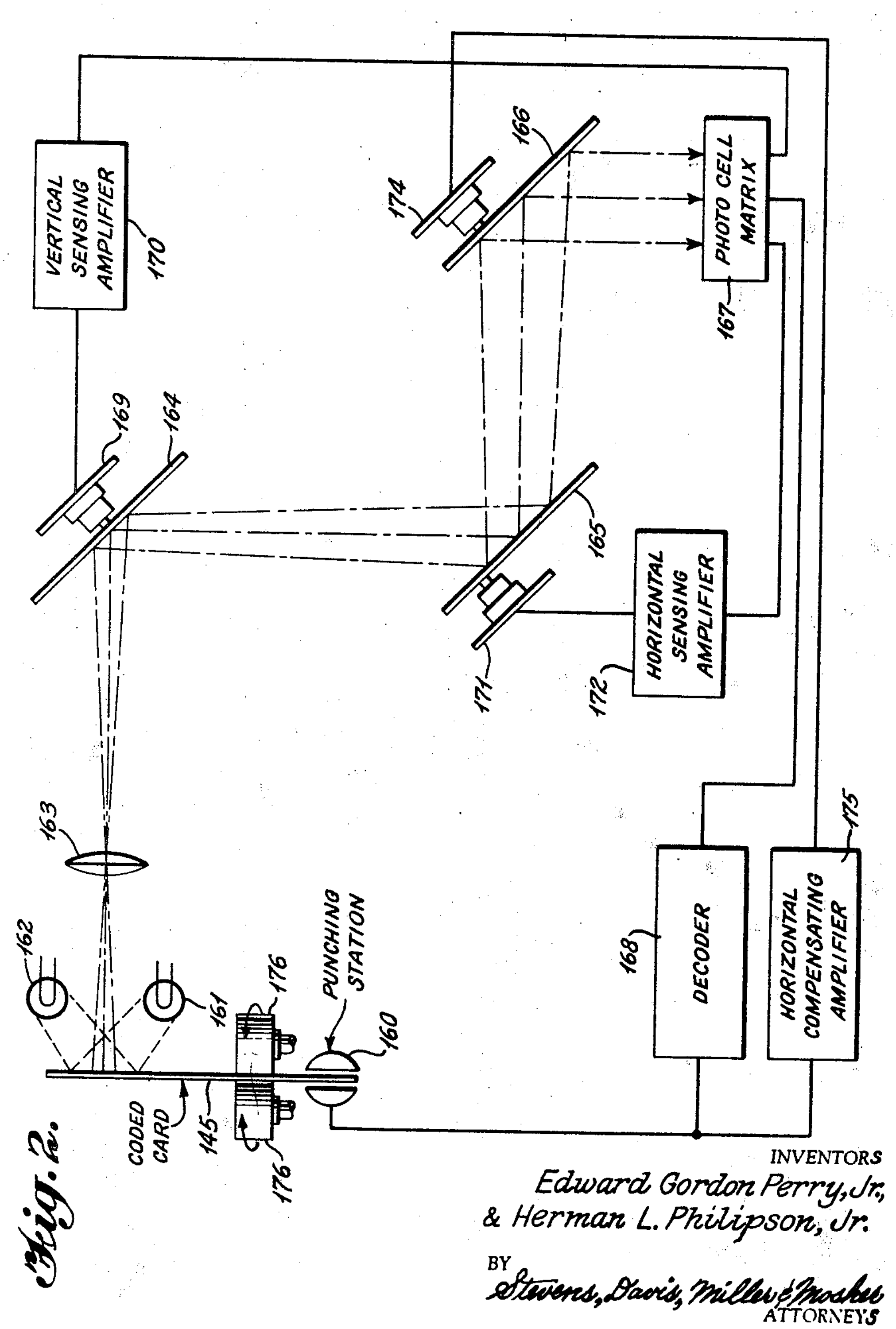
FIGURE 2 is a semi-diagrammatic view of one embodiment of the punching converter of the present invention.

Referring now to FIGURE 2 and to FIGURES 3*a* to 3*d* inclusive, these figures typify a diagrammatic representation of the punching converter of the present invention. For example, referring to FIGURE 2, a coded card such as invoice 145 which has been suitably imprinted with the information shown in FIGURE 1, is positioned in a punching station 160 such that a portion of the card is adapted to be perforated by the punching apparatus at the punching station. The card 145 is moved to the punching station 160 by a means 176 which may be a pair of rollers. A pair of illuminating lamps 161 and 162 are provided for the purpose of illuminating that portion of the coded card where the coded information (such as appears in the upper right-hand corner of FIGURE 1) is located. A suitable lens 163 is adapted to project the coded image from the card 145 to the surface of an inclined mirror 164 which in turn projects the image downwardly to a second inclined mirror 165. The second inclined mirror reflects the image in a horizontal direction to a third mirror 166. The third mirror 166 reflects the image in a downward direction to a photo cell matrix 167.

The photo cell martix, which is diagrammatically illustrated in greater detail in FIGURES 3*a* to 3*d*, inclusive, will receive the information provided by the lens and mirror system and will pass this information into a decoder 168 which will then actuate the punching apparatus at the punching station 160 in accordance with the information supplied to it from the photo cell matrix 167.

The above described system also includes a vertical mirror drive 169 for the purpose of adjusting the first mirror about a horizontal axis (preferably along the lower edge of the mirror). The information required for moving the first mirror 164 is obtained from the photo cell matrix through a vertical sensing amplifier 170 which controls the operation of the mirror positioning apparatus 169. Similarly, the second mirror 165 is provided with an apparatus 171 for adjusting this mirror about a vertical axis. This information is also supplied from the photo cell matrix to a horizontal amplifier 172. The purpose of the two means 169 and 171 is to insure that the image received by the photo cell matrix is properly oriented with respect to the individual components of the photo cell matrix.

The third mirror 166 is provided with a positioning apparatus 174 which turns this mirror about a vertical axis. However, this third mirror is driven in accordance with the movement of the coded card 145 from one punching position to the next successive punching position within the punching station. The information for controlling the operation of the mirror positioning apparatus 174 is sent back from the punching station through the compensating device 175.

A simplified form of the apparatus shown in FIGURE 2 would result if the third mirror 166 and its associated control device 174 were eliminated and its position occupied by the photo cell matrix 167. This would also eliminate the compensating means 175. Thus, the photo cell matrix 167 would be operating in conjunction with but two mirrors, i.e., mirrors 164 and 165.

The requirements of the optical system are merely that it should be capable of projecting the image of the coded characters onto the photo cell matrix with sufficient enlargement as to make each discrete area of the coded character of such a size that the particular photo cell in the matrix associated with that discrete area would be conveniently contained within said area. Thus, a simple convex lens of appropriate focal length will achieve this purpose.

Because of unavoidable variations in the location of the coded characters from card to card, it is necessary to provide corrective means to insure that the projecting image is correctly positioned on the photo cell matrix. To this end, two movable mirror systems are provided. Thus, mirror 164 is arranged to make corrections for variations in the vertical positioning of the coded characters. The second mirror 165, is for horizontal positioning. The vertical mirror is pivotally fastened to its associated driving device 169, the axis of motion being the horizontal bottom edge of said mirror. The mirror 165 is similarly fastened to its driving device 171 but the axis of motion is vertical, being one of the side edges of said mirror.

Each mirror has associated therewith a mechanism responsive to electrical signals to provide the driving force necessary to move the mirror pivotally about its hinged edge.

Two methods have been found to be particularly effective in providing the driving force required, but any means responsive to electrical signals could be utilized without departing from the scope of this invention. One such means, for example, is to provide a connection between the free edge of each mirror and a coil which is movably supported, parallel to its axis, within the field of a permanent magnet, in much the same manner as the voice coil of the permanent magnet type of loudspeaker is supported within the speaker. This type of magnet and coil mechanism is commercially available. With this arrangement, each mirror will have a central "rest" position when "no signal" is applied to the driving mechanism such that displacement to either side of this rest position may be obtained by applying a voltage of proper polarity to the movable coil. When the driving voltage is removed, the coil, with mirror attached, will be returned to its rest position by the restoring tendency of the coil suspension.

Another method for providing the mirror drive force differs only in that the coil to which the mirror is attached may be slidably positioned in the magnetic field rather than suspended in said field by means which tend to exert a restoring force to said coil. Due to the lack of a restoring force, the coil and its attached mirror tend to remain in whatever position to which they are displaced by the effect of the driving voltage until such time as a signal of opposite polarity is applied to return the coil and mirror to a neutral position.

Except for the problem of positioning the code on the photo cell matrix, said matrix means consists essentially of four photo cells arranged linearly, each cell being used to send the printed or unprinted condition of each of the four discrete areas of the code character. However, since there is a problem of positioning, additional means must be provided for sensing incorrect positioning. This is most easily done by adding position-sensing photo cells to the code matrix such that, when a code character is projected on to the matrix in an incorrect manner, a correcting signal will be created to adjust the angle of the proper mirror to correctly position the code character on the "reading" photo cells.

Sensing of improper positioning may be accomplished in a number of ways. Vertical positioning may be most conveniently brought about by sensing the position of zero reference characters printed alternately with the individual code characters. These zero reference characters are the blocks that are provided by the raised portions 85 on the stationary spacer plates.

Figure 3A:
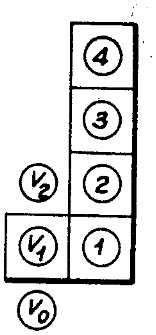
FIGURES 3(*a*) to 3(*d*), inclusive, are semi-diagrammatic views representing various different embodiments of the photo cell matrix which is shown in FIGURE 2.

Referring now to FIGURE 3*a*, it will be assumed that the photo cells designated by the reference numerals 1, 2, 3 and 4 correspond to the four discrete areas of the coded characters. Photo cells $V_0$, $V_1$ and $V_2$ are provided for sensing the position of the zero reference characters. The initial position of mirror 164 will be adjusted to represent the maximum downward deviation which can be anticipated. Thus, if none of the vertical sensing photo cells $V_1$, $V_2$ or $V_0$ have a darkened image of the reference character falling over them, the mirror 164 will be moved until a zero reference character is finally reflected on to photo cell $V_0$. Thereafter, the mirror is driven one step further until the reference character falls on $V_1$ which represents the proper position.

Later, if further characters are advanced past the reading station such that a zero reference character might fall upon photo cell $V_2$, due to the misalignment of individual code groups within a single series of printed characters, the image would be driven downward until the reference character falls again on $V_1$. Thus, the only condition which will satisfy the vertical system, is that in which the photo cell $V_1$ is in a darkened area and the photo cells $V_0$ and $V_2$ receive the full reflected light from the card.

Figure 3B:
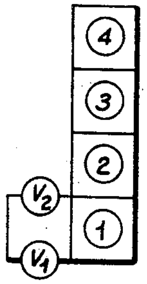

Another system for vertical positioning is shown in FIGURE 3*b* where only two vertical positioning photo cells $V_1$ and $V_2$ are employed. The satisfying condition in this case would be that the output of the two cells be equal. If photo cell $V_2$ received more light than $V_1$ and hence produced a greater electrical output (indicating a downward displacement of the code character) the mirror 164 would be driven to bring the image upward until the outputs of the two photo cells were again equal.

Horizontal positioning may be accomplished essentially in the same way and may be employed simultaneously with the vertical positioning. The only difference is that there is no "horizontal reference character" to assist in the horizontal positioning. The positioning of the coded numerals themselves must be sensed to effect correct positioning. Since it is not possible to predict which of the four discrete areas of the code character may or may not be printed, no single area can be used for sensing purposes. However, it will be noted that in any given code character at least one of the top three areas is utilized.

Figure 3C:
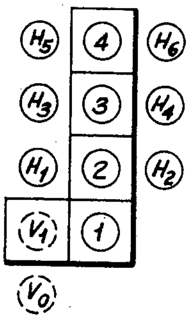

Hence, horizontal positioning can be effected by using three pairs of photo cells, each pair being associated with one of the three upper code areas and arranged as indicated in FIGURE 3*c*. It should be noted that the photo cell indicated as $H_1$ would necessarily be located in the same place as $V_2$ in the vertical system disclosed in FIGURE 3*a*. Thus, whereas the system of FIGURE 3*c* is entirely adequate for the purposes of horizontal positioning, it would not be practical to combine the system with that of 10*a* since a single photo cell would be unable to differentiate simultaneously between errors in vertical positioning and errors in horizontal positioning.

Figure 3D:
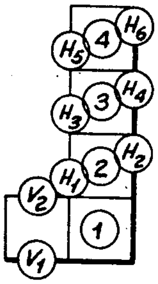

FIGURE 3*d* represents an arrangement whereby the means for compensating vertically is combined with that for compensating horizontally. In this embodiment the photo cells are located on the boundaries of the various areas involved. Thus, horizontal positioning is effected by arranging the photo cells in pairs and by requiring that each photo cell in each pair be exposed to an amount of light which is equal to that of the other photo cell in the same pair; i.e., the output of $H_1$ must be equal to that of $H_2$, $H_3$ to that of $H_4$, and $H_5$ to that of $H_6$. The vertical positioning of the reference characters is effected by $V_1$ and $V_2$, substantially in the same manner as described above in relation to FIGURE 3*b*. It is seen that regardless of which of the three uppermost code areas are filled in any given character, if that particular character is properly positioned on the matrix, each photo cell of the horizontal positioning system will receive the same amount of reflected light as its mate in the pair concerned. If an area is not used in the particular code character each cell of the pair will receive the full reflected light from the card and there will be no unbalance in their outputs. On the other hand, if that area is used, each cell will be partially in the darkened image and in such a manner that a balanced output will still be produced.

The only remaining problem regarding positioning is that introduced by the advancing of the card as each code character is read and punched into the card. In the absence of some preventive means, it should be apparent that the horizontal positioning system would tend to follow the first character read as the card is advanced one space forward. This may be avoided, first of all, by providing means for disabling the positioning system during the advance of the card. Then, when the advance is complete, the positioning system can be re-enabled and the mirror will lock the next code character into proper position on the matrix. The next character should be approximately correct after the advance of the card in the punching station because the spacing of the code characters is very nearly equal to the spacing of the columns on the standard card punching machine.

However, because it is inconvenient to make the code character and column spacings exactly equal and, further, because the accumulated error for which the horizontal positioning system must compensate becomes so large in multi-digit coded numbers as to exceed the compensating capabilities of said system, it has been found desirable to include separate means to compensate for the aforesaid difference in character and column spacing. It is for this reason that a third movable mirror, such as mirror 166, is provided together with its positioning means 174. The drive means 174 will shift the mirror a small fixed amount concurrently with each advance of the card being read in the punching station. This shift is adjusted exactly to equal the difference in code character and punch column width such that each code character will fall successively in the exact location as the preceding character, thus considerably lessening the action required of the horizontal positioning system.

Of course, some means must be provided to translate the reading photo cell outputs into a form suitable for the actuation of the card punch machine. This may be accomplished by any of several methods well known to those skilled in the art. However, in order to allow the machine to operate at its highest possible speed, it would seem most practical to use electronic means including a diode matrix with the necessary accompanying circuitry. Thus, each reading photo cell output would be amplified by conventional means and applied to an appropriate "trigger" circuit, the output of which would be used to trip associated "flip-flop" circuits. By conventional means, a diode matrix would be employed to sense the condition of the "flip-flop" and energize a specific output lead corresponding to any particular digit read by the photo cell. Thereafter, the energized output lead could be used to "fire" a thyratron tube circuit. Obviously, the plate circuit of the thyratron tube could be easily employed to actuate the card punching machine, thus perforating the cards in accordance with the coded number "read" from the card.

Whereas the present invention has been described herein with particular relation to the drawings attached hereto, it should be understood that other and further modifications, apart from those shown and suggested herein, may be made within the spirit and scope of this invention.

What is claimed is:

1. A punching converter for sensing a printed code on a card and for actuating a punching apparatus to perforate said card in a manner corresponding to the printed code, comprising a punching apparatus, means for supporting a card in said punching apparatus, said card having thereon a printed code, means for illuminating the portion of said card upon which said code is printed, a photo cell matrix having a first plurality of photo cells therein corresponding to the number of different positions in which said printed code actively exists, a lens and mirror system for focusing the image of said printed code onto said photo cell matrix, said mirror system including a first mirror positioned in the path of a horizontally projected image from said lens for reflecting said image in a substantially vertical direction, means operatively connected to said mirror for tilting said mirror about a substantially horizontal axis, a second plurality of photo cells in said photo cell matrix for sensing the vertical position of said image focused on said first plurality of photo cells, means responsive to the actuation of said second plurality of photo cells for actuating said tilting means for moving said first mirror for vertically aligning said image on said photo cell matrix, a second mirror positioned in the path of the reflected image from said first mirror for reflecting the image received from said first mirror in a horizontal direction onto said photo cell matrix, means for moving said second mirror about a substantially horizontal axis, a third plurality of photo cells in said photo cell matrix for sensing the horizontal position of the image focused on said first plurality of photo cells, means responsive to the actuation of said third plurality of photo cells for actuating said means for moving said second mirror so as to effect horizontal alignment of the image focused on said photo cell matrix, and a decoding device actuated by said first plurality of photo cells in said photo cell matrix for operating said punching apparatus in response to the information sent to said photo cell matrix from said printed code.

2. A punching converter for sensing a printed code on a card and for actuating a punching apparatus to perforate said card in a manner corresponding to the printed code, comprising a punching apparatus, means for supporting a coded card in said punching apparatus, said card having thereon a printed code, means for illuminating the portion of said card upon which said code is printed, a photo cell matrix having a first plurality of photo cells therein corresponding in number to the different positions in which said printed code exists, a first mirror, a lens for projecting the image of said printed code from said card horizontally towards said first mirror, said first mirror reflecting the image received from said mirror in a vertical direction, a second mirror positioned to receive the image reflected from said first mirror, said second mirror reflecting the image received from said first mirror in a horizontal direction, a third mirror positioned to receive the image reflected from said second mirror, said third mirror reflecting the image received from said second mirror in a vertical direction, a photo cell matrix having a first plurality of photo cells positioned to receive the image reflected by said third mirror, means for moving said first mirror about a substantially horizontal axis, means for moving said second mirror about a substantially vertical axis, means for moving said third mirror about a substantially vertical axis, a second plurality of photo cells in said photo cell matrix adapted to sense the vertical position of said image focused on said photo cell matrix and to actuate the means for moving said first mirror so as to produce vertical alignment of said image with respect to said first plurality of photo cells in said photo cell matrix, a third set of photo cells in said photo cell matrix for sensing the horizontal position of the image focused on said first plurality of photo cells in said photo cell matrix for actuating the means for moving said second mirror so as to produce horizontal alignment of the image focused on said first plurality of photo cells, a decoding device actuated by said first plurality of photo cells for operating said punching apparatus in response to the information provided to said photo cell matrix from said printed code, means for moving said card through successive punching positions in said punching apparatus and means responsive to the movement of said card to successive punching positions for actuating said means for moving said third mirror so as to align horizontally each successive character provided by said printed code on said first plurality of photo cells.

3. A punching converter for sensing a printed code on a card and for actuating a punching apparatus to perforate said card in a manner corresponding to the printed code, comprising a punching apparatus, means for supporting a coded card in said punching apparatus, said card having thereon a printed code, means for illuminating the portion of said card upon which said code is printed, a photo cell matrix having a plurality of photo cells therein corresponding in number to the different positions in which said printed code exists, a lens and mirror system for focusing the image of said printed code onto said photo cell matrix, means for automatically adjusting said mirror system about a substantially horizontal axis and a substantially vertical axis for orienting said image of said printed code properly with respect to said photo cell matrix, and a decoding device actuated by said photo cell matrix for operating said punching apparatus in response to the coded information supplied to said photo cell matrix from said printed code.

4. An apparatus converter for sensing a printed code on a card and for actuating a punching apparatus to perforate said card in a manner corresponding to the printed code, comprising a punching apparatus, means for supporting a coded card in said punching apparatus, said card having thereon a printed code, means for illuminating the portion of said card upon which said code is printed, a first plurality of photo cells constituting a photo cell matrix having a plurality of photo cells therein corresponding in number to the different positions in which said printed code exists, a lens and mirror system for focusing the image of said printed code onto said photo cell matrix, a second and a third plurality of photo cells, means responsive to the second and third plurality of photo cells, respectively, for automatically adjusting said mirror system about a substantially horizontal axis and a substantially vertical axis for orienting said image of said printed code properly with respect to said photo cell matrix, and a decoding device actuated by said photo cell matrix for operating said punching apparatus in response to the coded information supplied to said photo cell matrix from said printed code.

5. A punching converter for sensing information bearing characters on a card and for actuating a punching apparatus to perforate said card in a manner corresponding to said characters, comprising a punching apparatus, means for supporting a card in said punching apparatus, said card having thereon said characters, means for illuminating the portion of said card upon which said characters are printed, first light responsive means for providing an output characteristic of the sensed characters, a lens and mirror system for focusing the image of said characters onto said first light responsive means, said mirror system including a first mirror positioned in the path of a horizontally projected image from said lens for reflecting said image in a substantially vertical direction, means operatively connected to said mirror for tilting said mirror about a substantially horizontal axis, second light responsive means for sensing the vertical position of said image focused on said first light responsive means, means responsive to the actuation of said second light responsive means for actuating said tilting means for moving said first mirror for vertically aligning said image on said first light responsive means, a second mirror positioned in the path of the reflected image from said first mirror for reflecting the image received from said first mirror in a horizontal direction onto said first light responsive means, means for moving said second mirror about a substantially horizontal axis, a third light responsive means for sensing the horizontal position of the image focused on said first light responsive means, means responsive to the actuation of said third light responsive means for actuating said means for moving said second mirror so as to effect horizontal alignment of the image focused on said first light responsive means, and a decoding device actuated by said first light responsive means for operating said punching apparatus in response to the information sent to the three light responsive means from said sensed characters.

6. A punching converter for sensing an information bearing character on a given card and for actuating a punching apparatus to perforate a card in a manner corresponding to the information bearing character, comprising a punching apparatus, means for supporting a card to be punched in said punching apparatus, the given card having thereon at least one information bearing character, means for illuminating the portion of the given card having the information bearing character thereon, light responsive means for providing a signal corresponding to the information bearing character, a lens and mirror system for focusing the image of said information bearing character onto said light responsive means, means for automatically adjusting said mirror system about a substantially horizontal axis and a substantially vertical axis for orienting said image of said character properly with respect to the light responsive means and a decoding device actuated by said light responsive means for operating said punching apparatus in response to the coded information supplied to said light responsive means from the information bearing character on the given card.

7. A punching converter for sensing an information bearing character on a given card and for actuating a punching apparatus to perforate a card in a manner corresponding to the information bearing character, comprising a punching apparatus, means for supporting a card to be punched in said punching apparatus, the given card having thereon at least one information bearing character, means for illuminating the portion of the given card having the information bearing character thereon, first light responsive means for providing a signal corresponding to the information bearing character, a lens and mirror system for focusing the image of said information bearing character onto said light responsive means, second and third light responsive means, means responsive to the second and third light responsive means respectively for automatically adjusting said mirror system about a substantially horizontal axis and a substantially vertical axis for orienting said image of said character properly with respect to the first light responsive means, and a decoding device actuated by said first light responsive means for operating said punching apparatus in response to the coded information supplied to said light responsive means from the information bearing character on said given card.

References Cited in the file of this patent

UNITED STATES PATENTS 2,699,210 Perrin ---------------- Jan. 11, 1955
2,922,332 Lentz et al. ------------ Jan. 26, 1960

FOREIGN PATENTS 1,050,482 France ---------------- Jan. 7, 1954